March 13, 1928. 1,662,437
K. E. PEILER
APPARATUS FOR FEEDING MOLTEN GLASS
Original Filed July 28, 1920 2 Sheets-Sheet 1
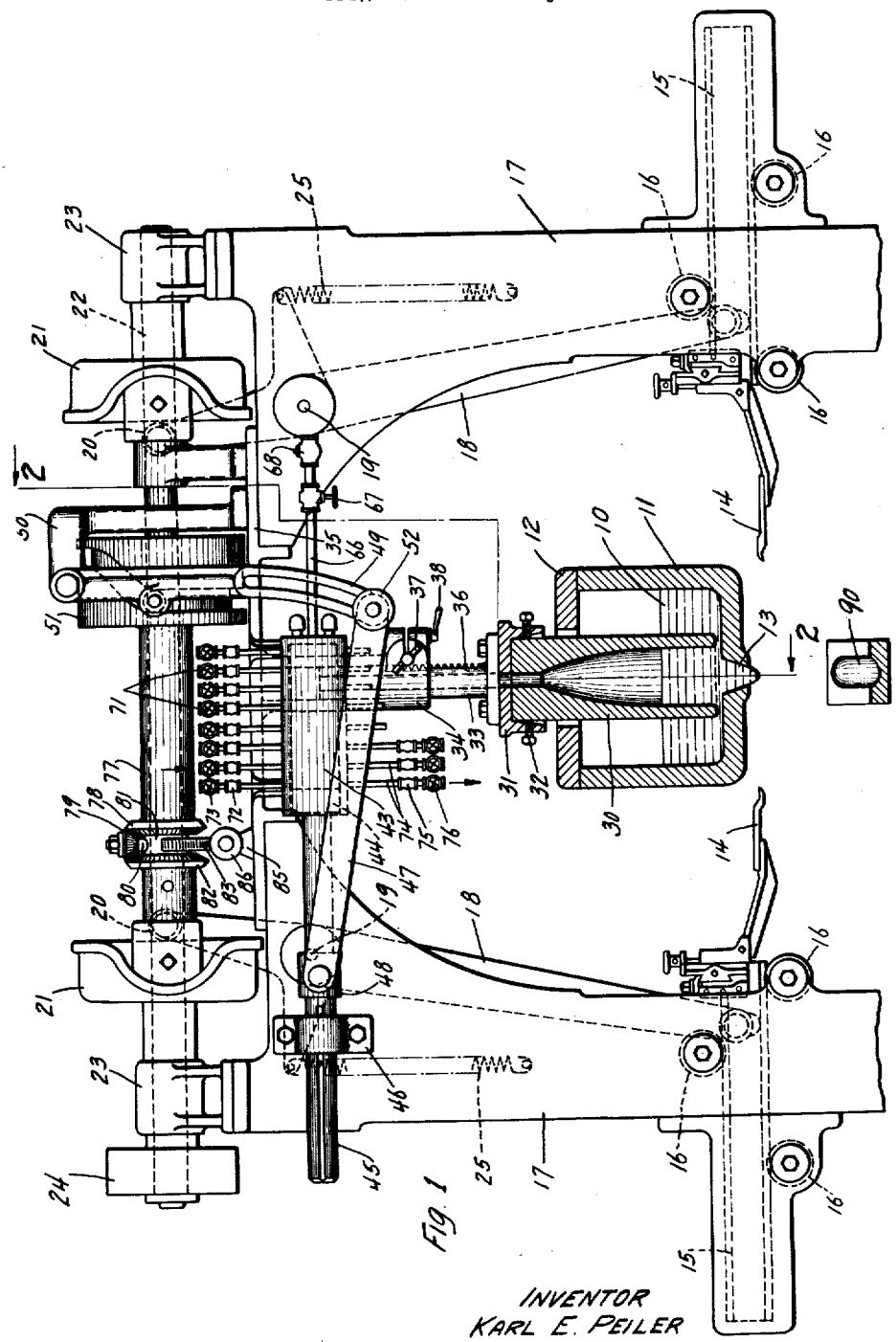
INVENTOR
KARL E. PEILER
BY
ATTORNEY March 13, 1928.
K. E. PEILER
1,662,437
APPARATUS FOR FEEDING MOLTEN GLASS
Original Filed July 28, 1920    2 Sheets-Sheet 2
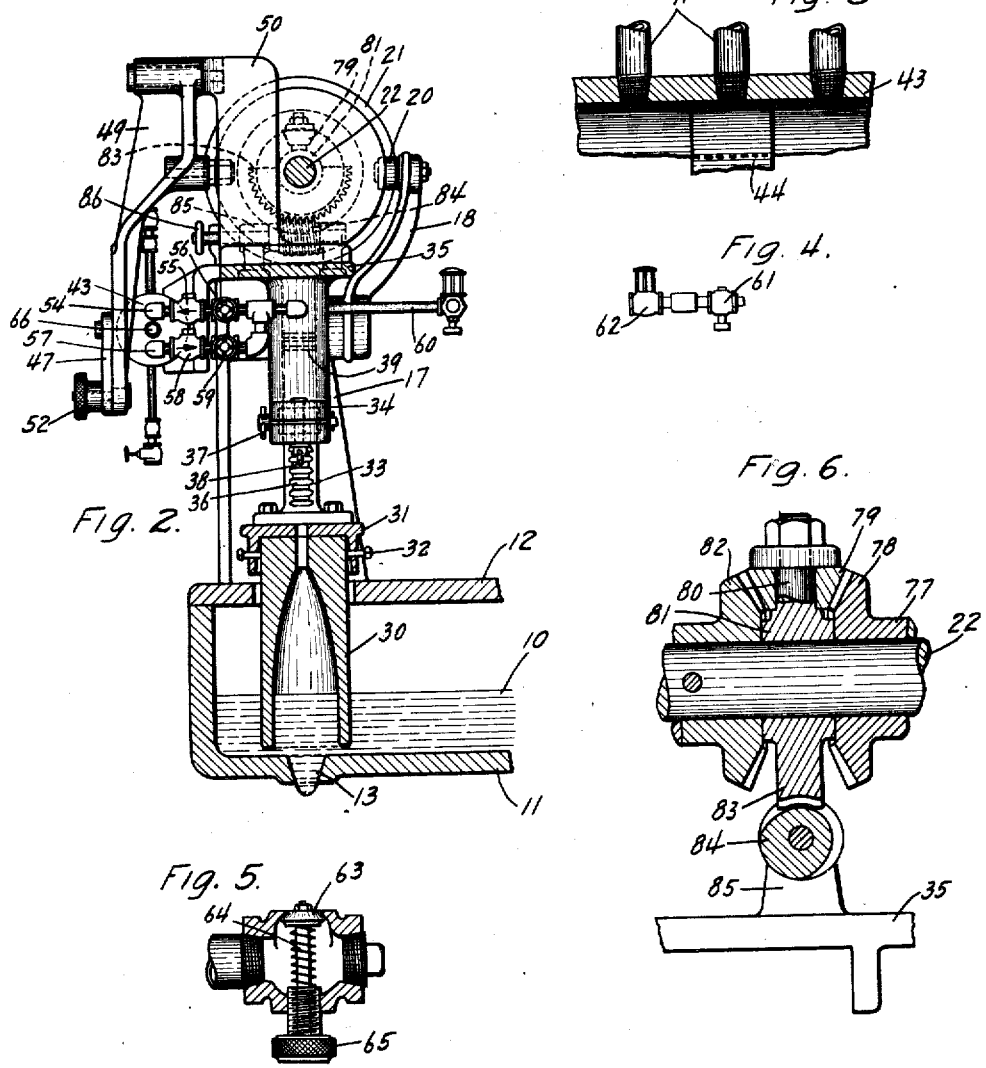
INVENTOR
KARL E. PEILER
BY
ATTORNEY.

Patented Mar. 13, 1928.

1,662,437

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

APPARATUS FOR FEEDING MOLTEN GLASS.

Application filed July 28, 1920, Serial No. 399,595. Renewed September 2, 1926.

This invention relates to apparatus for feeding molten glass to the devices by which it is to be further shaped, as by molding or blowing. More specifically, the invention relates to apparatus constructed and arranged to separate and deliver a series of masses of glass of suitable size and shape to serve as mold charges for the subsequent forming operation.

Various machines have been provided for this purpose, in which the container for the molten glass is provided with a submerged outlet, and the flow and cessation of flow is caused by extruding and intruding impulses imparted to the glass in or near the outlet. In some of these machines, the impulses are produced by changes in the air pressure on the surface of the glass near the outlet; that is, the air above the outlet may be compressed above atmospheric pressure to cause extrusion of the glass, and reduced to a partial vacuum to cause a cessation of the extrusion, or in some cases, an intrusion of the extruded mass, or the severed stub thereof. The gather is suspended beneath the outlet, and shears are usually provided to sever the mold charge from the gather. In this way, a series of charges is formed of a size and form dependent in part on the pressure and duration of the application of the abnormal air pressures, and these charges are of uniform size and shape so long as all conditions remain constant.

It is of great advantage to have the gather shaped to conform to some extent to the shape of the mold in which the charge is to be received, and it has been discovered that the shape of the gather can be controlled by varying the rate of discharge of the molten glass to successive portions of the gather. By this method an increase in the rate of discharge increases the diameter of that portion of the gather to which it is delivered and, conversely, a decrease in the rate reduces the diameter of a corresponding part of the gather. If a uniform rate of discharge is maintained to all parts of the gather, it assumes a pear shape with an attenuated neck, of the same general shape as is produced by a constant gravity discharge, which is the usual shape well known in the art. Furthermore, in order to maintain any particular size or shape of gather, it is desirable that the several parts and forces acting to form the gather shall be capable of delicate relative adjustment so as to permit variation in the rate of flow to compensate for variation in other conditions, such as the fluidity of the glass, which are not easily controlled.

The object of the present invention is to provide an apparatus of the general character described, which will form and deliver a series of uniform mold charges of various sizes and shapes, suited for the particular ware being manufactured. To the accomplishment of this object, the features of the invention reside in such an apparatus having provision for relative adjustment of the several forces acting to form the gather. The impulses acting to form and shape the gather are produced by variation in the air pressure which controls the rate and time of discharge of the glass, and therefore means is provided for varying the air pressure from a condition approaching a vacuum to normal atmospheric pressure and to a condition of compression higher than normal. Means is also provided to permit relative adjustment of the time of occurrence and duration of the various air pressures. By a proper adjustment of these pressures, mold charges of any desired shape and size may be produced, and slight adjustments may be made to counteract otherwise uncontrollable changes in conditions involved, and uniformity in shape and size of the charges may be maintained.

Another object of the invention is to provide a machine for forming and separating mold charges by the use of varying air pressures in which the pressure generating devices are incorporated in a unitary structure. To this end the invention contemplates the provision of pneumatically controlled mold charge forming apparatus, in which a generator or pump is included, arranged to cause either a compression or a rarification of the air controlling the formation of the gather or mold charge.

A further object of the invention is to provide an apparatus including such a pump which will generate pressure or vacuum at desired intervals, and which will have provision to permit adjustment of the relative time of occurrence, duration and degrees of these pressures. These features and such others as may hereafter appear, will best be understood from the following description taken in connection with the accompanying drawings in which:—

Fig. 1 is a front elevation partly in section, of a glass feeding machine, showing a portion of the cooperating molten glass container or furnace;

Fig. 2 is a section on the line 2—2 of Fig. 1;

Fig. 3 is a sectional detail on an enlarged scale, showing a longitudinal section of a portion of the pressure generating pump;

Fig. 4 is a detailed view of certain pressure relief valves to be hereinafter described;

Fig. 5 is a longitudinal section on an enlarged scale of the vacuum relief valve shown in Fig. 4; and Fig. 6 is a longitudinal section through the adjustable driving mechanism, by which the time of actuation of the pump is adjusted with relation to the other parts of the machine.

The molten glass 10 which is to be divided into mold charges is confined in a suitable container, such as the forehearth 11, which may be an extension from the usual glass melting furnace, or which may be supplied with molten glass in any convenient way. The forehearth is provided with a cover 12, and if desired, may also be provided with heat insulating packing, and with auxiliary heating means, not shown. The bottom of the forehearth is provided with an outlet 13 which is always submerged in the glass.

The severing means employed for separating a mold charge from the gather suspended below the outlet may be of any of the well-known devices for this purpose, but for the purpose of illustration, there is shown a pair of cooperating shear blades 14, adjustably secured to the ends of slides 15 so as to be capable of movement toward and from each other to sever the glass therebetween. The slides are supported by antifriction rolls 16 mounted in the columns of a bridge member 17. The slides are actuated to sever the mold charge at the proper time by a pair of levers 18, pivoted on the bridge member at 19, having their upper ends provided with rolls 20, which are held by the springs 25, in operative relation with a pair of cams 21 (Fig. 1). The cams are fixed on a shaft 22, mounted in bearings 23 on the top of the bridge member 17. The shaft is provided with a pulley 24 which may be driven by belt connections with a source of power.

The air pressure which controls the movement of the glass through the outlet 13 may be applied to the entire surface of the glass in the container, but it is preferred to limit the area to which abnormal pressures are applied by the use of a hollow cylinder or bell 30 of refractory material, which enters the container through a suitable opening in the cover 12, and has its lower end submerged in the glass above and opposite the outlet. The glass to be discharged through the outlet must first pass between the lower edge of the bell and the bottom of the container, and in order that the desired amount of glass may be admitted to the interior of the bell at the proper speed, and to vary the amount, means is provided for adjusting the bell vertically toward and from the outlet. For this purpose the top of the bell is provided with a perforated cap 31 rigidly attached to the bell by the means of screws 32. The cap is secured to the flanged lower end of a tube 33 adjustably secured within a sleeve 34 depending from a table 35, forming the top of the bridge member. The tube may be adjusted vertically by manipulation of a handle 37 which turns a pinion (not shown) in mesh with a rack 36 formed on one side of the tube. The tube is locked in adjusted position by suitable locking means, such as the hand nut 38, which clamps the pinion shaft against rotation. It will be observed that the bell may be adjusted vertically without disturbing its connection with the interior of the sleeve 34, so that varying air pressures applied to the upper end of the sleeve will be transmitted to the interior of the bell. Suitable packing may be provided as indicated at 39 (Fig. 2) in order to make a tight joint between the tube and the interior of the sleeve.

The shape of the gather formed below the outlet 13 may be controlled within certain limits by variation in the air pressure within the bell to cause a more or less rapid extrusion. An increase in the rate of extrusion acts to increase the diameter of that portion of the gather then being extruded, and conversely a decrease in the rate of extrusion will reduce the corresponding portion of the gather. In the present invention, these changes in the rate of discharge are produced by the variation in the air pressure in the bell. It will be understood that the term "air pressure" as used in this description and in the appended claims comprehends within its meaning any pressure whether at, above or below normal atmospheric, unless otherwise limited by the context. Thus, increased air pressure in the bell 30 will cause a more rapid rate of discharge and increase the diameter of that particular portion of the gather. If the air pressure within the bell is normal, the action of gravity will cause the previously extruded gather to elongate and produce an attenuated neck as is well known in the art. As the air pressure is reduced below atmospheric, the rate of extrusion will decrease, producing a corresponding decrease in the diameter of the portion of the gather being extruded, and finally stop the extrusion which may become an intrusion. The rapidity with which the air pressures are changed determines the sharpness of the variation in the diameter of the gather, and an important factor in determining the shape of a gather is the relative time of application and duration of the various pressures applied to the glass.

One feature of the invention contemplates the provision of an apparatus of the character described including a pressure generator or pump, which is automatically actuated and generates the required pressure, above or below normal, in timed relation with the formation of the charge. In the illustrated embodiment of the invention, the air pressure is generated by a reciprocating pump, comprising a cylinder 43 and a cooperating piston 44, which is reciprocated by a piston rod 45. The cylinder is rigidly mounted in suitable brackets projecting from the table 35, and the piston rod 45 is arranged to slide in a bearing 46 in which it is splined to prevent rotation. The piston is reciprocated by a link 47 pivotally connected with a collar 48, which may be adjustably secured to the piston rod 45. The other end of the link 47 is connected with a lever 49 mounted on a stud carried by a fixed bracket 50. The lever 49 is oscillated by a cam path of suitable shape in a cam 51. In order that the stroke of the piston may be adjusted in amplitude and speed or rate of displacement, the lever 49 is provided with a slot and the link is held in adjusted position in the slot by a hand nut 52. The length of the path of travel of the piston may be adjusted while its position at one extreme remains constant, by reason of the slot in the lever 49 being formed on a radius equal to the length of the link 47, and having its center coincident with the center of the connection between the link and the collar 48. It is preferred that the curvature of the slot shall be such that when the piston is at the bottom of the cylinder, or to the right in Fig. 1, the link may be adjusted in the slot without producing any movement in the piston.

As the piston reciprocates within the cylinder, alternate compression and rarification of the air within the cylinder will take place. This is communicated to the interior of the bell 30 by suitable pipes which connect the end of the cylinder with the sleeve 34. In order to regulate the pressure and vacuum independently, and that the rate at which these pressures generated in the cylinder are communicated to the bell may be varied independently of the rate at which such pressures are built up within the cylinder, it is preferred that the connection between the cylinder and the sleeve shall comprise two pipes, one for the admission of compressed air and the other for the application of the vacuum. The end of the cylinder is connected with the sleeve by a pipe or conduit 54, including a check valve 55 (Fig. 2) which is arranged to permit the passage of air only in the direction of the arrow. A throttle valve 56 is provided so that the rate at which air passes in the direction of the arrow may be varied by the adjustment of the valve. A second pipe connection or conduit 57 includes a similar check valve 58, and a throttle valve 59, but this check valve acts to permit the passage of air only in the opposite direction as indicated by its arrow. By this construction, when a vacuum is created within the cylinder, the check valve 58 prevents air from being withdrawn from the bell through the pipe connection 57, and causes the vacuum to be established in the bell by the withdrawal of air through the pipe connections 54, and by the proper adjustment of the throttle valve 56, the rate at which the vacuum is transmitted to the bell may be adjusted independent of the rate at which the vacuum is built up within the cylinder. In a similar manner, the rate at which compression built up within the cylinder is transmitted to the bell may be controlled by adjustment of the throttle valve 59.

In order to limit the range of pressure and vacuum in the interior of the bell and connected apparatus, the sleeve 34 is connected with a pipe 60, which communicates with two relief valves 61 and 62, as shown in Fig. 4. The valve 62 is of the usual type employed for the purpose of permitting the escape of air when the pressure rises to a point above that at which the valve is set, and the valve 61 performs a similar function when a vacuum exists in the system. The valve 61, as shown in detail in Fig. 5, comprises a plunger 63 which is held outwardly against a suitable valve seat by a spring 64, the pressure of which may be adjusted by manipulating the hand screw 65, which forms an abutment for one end of the spring. When the vacuum becomes sufficient to overcome the spring 64, the valve opens and air is admitted to reduce the vacuum.

In some instances it may be desirable that the compressed air remaining in the system after the completion of the compression stroke shall be allowed to escape and atmospheric pressure restored, as for example at the end of each cycle. For this purpose a pipe 66 communicates with the interior of the bottom of the cylinder and is provided with a throttle valve 67 and a check valve 68. The check valve prevents the entrance of air to the cylinder when a vacuum is being created but allows compressed air to escape at a rate determined by the setting of the throttle valve 67. By this construction, when the piston is at the compression end of its stroke, atmospheric pressure will be restored therein after an interval of time depending upon the setting of the throttle valve 67.

The pressure curve generated in the cylinder is determined by the shape of the cam path in the cam 51, and in order that this curve, which represents the extent and rapidity with which abnormal pressures are built up within the cylinder and, therefore the rate of extrusion or intrusion of the glass, may be varied, additional pressure controlling devices are provided. This control may be secured by providing the cylinder with a series of vents of adjustable effective area, which are successively opened or closed by the movement of the piston. As shown in Fig. 1 the cylinder is provided on diametrically opposite sides with two series of longitudinally arranged pipes communicating with its interior. One set of these pipes indicated as a whole at 71 is each provided with a check valve 72 and a throttle valve 73. The check valves in this set of pipes are such that air is permitted to enter the cylinder but is prevented from escaping. The rate at which the air is permitted to enter any pipe is determined by the setting of its throttle valve 73, and if desired, the valve may be wholly closed so as to render the pipe ineffective. It will be apparent from Figs. 1 and 3 that as the piston travels to the left to create a vacuum within the cylinder, the pipes 71 will be successively brought into communication with the vacuum side of the piston. By proper adjustment of the throttle valves 73, the vacuum within the cylinder may be increased as rapidly as is possible in accordance with the shape of the cam 51, or it may be built up less rapidly or held substantially constant for a portion of the piston stroke by suitable adjustment of the valves.

The other side of the cylinder is provided with a similar series of pipes 74 which are provided with check valves 75 and throttle valves 76. These check valves are arranged to permit the escape of air, but to prevent it from entering the cylinder, so that they are ineffective during the creation of a vacuum. When pressure exists in the cylinder, its formation will be determined by the setting of the valves 76 in the pipes which will be successively cut off by the advancement of the piston. Thus the pressure curve indicative of the successive pressures within the cylinder may be varied by opening the valves 76 a proper amount.

A further control of the shape of the extruded gather may be had by varying the time of severing with relation to the formation of the gather, and in order that the time of operation of the shears may be adjusted with relation to the pressures created in the cylinder, means is provided for adjusting the timed relation between the pump actuating cam 51 and the shear actuating cams 21. As illustrated the cam 51 is mounted on a sleeve 77, loosely mounted on the shaft 22. The left end of this sleeve carries a bevel gear 78 which is in mesh with a pinion 79, loosely mounted on a stud 80 projecting from a collar 81. The pinion 79 is driven by a gear 82 fixed to the shaft 22. The collar 81 being held from rotation, rotary movement is transmitted from the shaft 22 through the gear 82, and the pinion 79 to the gear 78 which will drive the cam 51 in the opposite direction from the shaft 22 on which it is mounted. In order that the time of the cam 51 may be advanced or retarded, means is provided for turning the collar 81, and holding it in adjusted position. For this purpose, the lower portion of the collar is provided with a gear 83 which is in engagement with a worm 84 on a shaft carried by bearings 85 on the table 35. The shaft is provided at its outer end with a hand wheel 86 by which the worm may be turned, thus varying the relation between the driving gear 82 and the driven gear 78, which is directly connected with the cam 51. By this construction the timed relation between the severing operation and the formation of the gather may be adjusted.

The relative time of occurrence of the various steps in the operation of the apparatus may be varied widely, and it is to be understood that the adjustments and operation described are by way of example only. The vertical position of the bell 30 would first be adjusted by manipulation of the handle 37 to give the necessary space for the entrance of the desired amount of glass between the bottom edge of the bell and the bottom of the container, and it would be locked in position by the hand nut 38. Starting the cycle of the apparatus with the completion of the severing operation, the first movement observed will be a retraction of the stub protruding from the outlet 13. This retraction of the stub is caused by the vacuum produced by the outward movement of the piston 44 in its cylinder, the range of movement being determined by the setting of the link 47 in the slot of the lever 49, and, if desired, by the position of the collar 48 on the piston rod 45. This movement may begin just prior to the severing operation or soon thereafter, and at whatever time it may occur, a vacuum will be built up within the bell in accordance with the setting of the various valves. If all of the valves 73 are closed, the vacuum curve generated in the cylinder will be determined by the shape of the path of the cam 51. The curve may be modified by adjustment of the valves, for instance, the first three valves uncovered by the piston in its movement to the left might be closed so as to permit the pressure to be built up during that part of the stroke in accordance with the shape of the cam. The next two valves might be opened slightly so as to prevent increase in the vacuum in accordance with the continued rise in the cam, and the remaining valves might be wide open so as to shorten the duration of the vacuum. By the time all of the pipes had been uncovered, atmospheric pressure would be partly or completely restored within the cylinder and, therefore, within the bell, depending on the setting of the valves. In order that normal pressure may be restored within the bell before an excessive amount of glass is drawn into the bell in case the machine should be stopped while a vacuum existed, the last valve uncovered by the piston on its vacuum stroke may be left open enough to restore normal pressure in a short time. This adjustment is of importance as it prevents glass from being drawn into the pipes and freezing as sometimes occurs when the machine is stopped, making it necessary to disassemble the machine to remove the obstruction. When the machine is set so as to permit normal pressure within the bell after the occurrence of vacuum, the action of gravity on the glass within the bell, which at that time will be at a level slightly higher than that indicated in Fig. 1, will cause a slow extrusion to take place, which at its start might appear as shown in the drawing. After an interval of time, depending on the shape of the cam path, the piston will start its compression stroke, to the right in Fig. 1. It might be desired to prevent the formation of pressure until after the cylinder had performed a part of its stroke, in which case the first of the series of valves 76 encountered during this movement would be wide open. After the last open valve had been passed by the piston, the shape of the pressure curve in the cylinder will depend upon the amount of opening, if any, of the successive valves not yet cut off by the advance of the piston. The pressure built up in the cylinder causes a corresponding pressure in the bell, and therefore proportionately varies the rate of discharge.

In order that the rapidity with which the pressure formed in the cylinder is communicated to the bell and effects variation in the diameter of the gather as it extrudes from the outlet, may be further varied, the valve 59 may be adjusted. The setting of this valve would determine the rate at which the pressure could pass to the bell and by reducing the orifice of the valve, delay the transmission of pressure from the cylinder to the bell in accordance with the abruptness desired in the change of diameter of the gather.

After a gather of desired shape and size has been extruded, the cams 21 will cause the shear blades 14 to sever a mold charge therefrom, which drops onto a chute 90 or into a mold or some receptacle by which it is to be transferred or further manipulated. The relative time of the formation of the gather, and the action of the severing means can be adjusted by turning the hand wheel 86. After the piston has completed its compression stroke, which would be approximately at the time of severing, the pressure remaining in the cylinder and the bell may be reduced to normal atmospheric by the escape of air through the pipe 66 at a rate determined by the setting of the valve 67. During the occurrence of pressure in the system any excess beyond a chosen pressure may be allowed to escape through the relief valve 62, and in like manner, during the occurrence of vacuum, the vacuum may be kept below any desired point by the relief valve 61.

Just prior to, or during the completion of the severing operation, the piston will start its vacuum stroke, the severed stub will be intruded and the cycle of operation completed. It will be observed that the time of the various movements of the apparatus may be varied first in accordance with the setting of the pump by the hand nut 52 and the collar 48; second, by controlling the rate at which pressure is generated in the pump by means of the valves 73 and 76; and third, by the rate at which the generated pressure is transmitted to the bell as determined by the setting of the valves 56 and 59.

While a specific embodiment of the invention has been described in which the several features are employed in conjunction it is to be understood that such conjoint use is not essential to the invention and that the details of construction and arrangement of parts may be widely varied within the skill of an artisan without departing from the scope of the invention, as defined in the following claims.

This application is a continuation of my prior copending applications, Serial No. 396,935, filed July 17, 1920, on which Patent No. 1,405,936 was granted on February 7, 1922, and Serial No. 396,934, filed July 17, 1920, for all subjects matter common to the present application and my said prior applications.

What is claimed as new is:—

1. The combination with apparatus for separating molten glass into mold charges, of a glass container having a submerged outlet, a pump for supplying abnormal air pressure to the surface of the glass to control its movement in the outlet, and means independent of the pump for variably regulating the air pressure.

2. The combination with apparatus for separating molten glass into mold charges, of a glass container having a submerged outlet, a pump for supplying abnormal air pressure to the surface of the glass to control its movement in the outlet, means for actuating the pump in a uniform manner, and means communicating with the pump cylinder for controlling the rate of variation of pressure generated by the pump.

3. The combination with apparatus for separating molten glass into mold charges, of a glass container having a submerged outlet, a pump arranged to produce successive compression and vacuum, connections between the pump and the container by which impulses of extrusion and intrusion are imparted to the glass in the outlet, and means communicating with the pump cylinder for varying the degrees of compression and vacuum impulses imparted to the glass, to control the shape of the mold charges.

4. The combination with apparatus for separating molten glass into mold charges, of a container for the glass having a submerged outlet, a pump, means for actuating the pump to apply alternate pressure and vacuum to the glass, and means rendered effective by relative movements of parts of the pump for independently adjusting the duration of application of the pressure and vacuum.

5. The combination with apparatus for separating molten glass into mold charges, of a container for the glass having a submerged outlet, a pump, means for actuating the pump to apply air pressure to the glass, and an adjustable connection between the pump and its actuating means for changing the length of the stroke of the pump, whereby its displacement may be varied.

6. The combination with apparatus for separating molten glass into mold charges, of a container for the glass having a submerged outlet, a pump, means for actuating the pump to apply successively varying air pressures to the glass, and an adjustable connection between the pump and its actuating means for changing the length of the stroke of said pump, whereby its displacement may be varied.

7. The combination with apparatus for separating molten glass into mold charges, of a container for the glass having a submerged outlet, a pump, means for actuating the pump to apply air pressure to the glass, an adjustable connection between the pump and its actuating means by which the displacement may be varied, and means for controlling the rate of variation of pressure generated by the pump.

8. The combination with apparatus for separating molten glass into mold charges, of a container for the glass having a submerged outlet, a pump, means for actuating the pump to apply successively varying air pressures to the glass, an adjustable connection between the pump and its actuating means by which the displacement may be varied, and means for varying the relative duration of said varying air pressures.

9. The combination with apparatus for separating molten glass into mold charges, of a reciprocating pump adapted to supply air at a variable rate, a conduit for transmitting air pressure from the pump to the surface of the glass, and means communicating with the pump cylinder for controlling the rate of variation of pressure generated during a single movement of the pump.

10. The combination with apparatus for separating molten glass into mold charges, of a pump having a reciprocating member operating in a uniform manner, a conduit for transmitting air pressure from the pump to the surface of the glass, and means controlled by the pressure generated by the pump at each reciprocation for varying the air pressure.

11. The combination with apparatus for separating molten glass into mold charges, of a pump having a reciprocating member operating in a uniform manner, a conduit for transmitting air pressure from the pump to the surface of the glass, and adjustable means controlled by the pressure generated by the pump at each reciprocation for varying the air pressure.

12. The combination with apparatus for separating molten glass into mold charges, of a pump, a conduit for transmittitng air pressure from the pump to the surface of the glass, means for actuating the pump to build up an abnormal air pressure at a predetermined rate, means for limiting the amount of said pressure, and means to permit adjustment of the rate at which the air pressure is built up.

13. The combination with apparatus for separating molten glass into mold charges, of a pump, a conduit for transmitting air pressure from the pump to the surface of the glass, means for actuating the pump to produce successively two different abnormal air pressures, and separate means for independently adjusting each of said different pressures.

14. The combination with apparatus for separating molten glass into mold charges, of a pump, a conduit for transmitting air pressure from the pump to the surface of the glass, means for actuating the pump to produce alternate compression and vacuum, and means for independently adjusting the amount and duration of the application of compression and vacuum.

15. The combination with apparatus for separating molten glass into mold charges, of a pump having a vent to the atmosphere and a conduit for transmitting air pressure from the pump to the surface of the glass, the arrangement being such that the effective area of the vent is automatically varied during a single operation of the pump.

16. The combination with apparatus for separating molten glass into mold charges, of a pump comprising a fixed and a movable member, one of the members being provided with a plurality of vents arranged to be successively opened or closed by the relative movement of the members, means for adjusting the opening of each vent, and connections between the pump and the receptacle for applying air pressure to the glass.

17. The combination with apparatus for separating molten glass into mold charges, of a reciprocating pump arranged to produce compression and vacuum on alternate strokes, a conduit for transmitting air pressure from the pump to the surface of the glass, and separate and independent means for varying the rate of generation of said compression and the rate of vacuum.

18. The combination with apparatus for separating molten glass into mold charges, of a reciprocating pump having two series of vents to the atmosphere and arranged to be successively opened or closed by the moving part of the pump, means to prevent escape of air from the pump through one series of vents, means to prevent the entrance of air to the pump through the other series of vents, means for adjusting the opening of each vent, and a conduit for transmitting air pressure from the pump to the surface of the glass.

19. The combination with apparatus for separating molten glass into mold charges, of a cylinder having two longitudinally arranged series of vents, a conduit connecting the cylinder with the surface of the glass in the receptacle, a piston in the cylinder, means for effecting a relative movement between the cylinder and the piston, check valves in the vents arranged to open in opposite directions in the respective series, and a throttle valve in each vent.

20. The combination with apparatus for separating molten glass into mold charges, of a cylinder having two longitudinally arranged series of vents, a conduit connecting the cylinder with the surface of the glass, a piston in the cylinder arranged to successively open or close the vents during its travel, means for reciprocating the piston, to alternately produce compression and vacuum, check valves in the vents, the valves in one series arranged to operate on compression, and the valves in the other series arranged to operate on vacuum conditions in the cylinder, a throttle valve in each vent, independent means for varying the rate of transmission of said compression and vacuum to the glass, and means for varying the length of stroke of the piston.

21. The combination with apparatus for separating molten glass into mold charges, including a container having a submerged outlet, of a pump, means for actuating the pump to apply air pressure to the glass, means for severing a mold charge from a gather suspended below the outlet, and means operative during the operation of the apparatus for advancing or retarding the time of actuation of the pump in respect to the time of operation of the severing means and without change of the time of said operation of the severing means.

22. The combination in apparatus for separating molten glass into mold charges, of a pump, uniformly driven means for actuating the pump to apply successively varying air pressures to the glass to extrude a gather, means for severing a mold charge from the gather, and means including a plurality of independently adjustable valves for varying the rate of variation of the pressure generated by the pump.

23. The combination with apparatus for separating molten glass into mold charges, of a glass container having a submerged outlet, a bell having its lower end projecting into the glass opposite the outlet, means for adjusting the bell toward and from the outlet, air pump mechanism, including adjustable means communicating with the pump cylinder for variably regulating the air pressures of the pump during its operation, a conduit for transmitting these pressures from the pump to the surface of the glass in the bell to control the discharge thereof through the outlet, means for severing mold charges from the gathers suspended from the outlet, and means for operating the severing means and the pump.

24. The combination with apparatus for separating molten glass into mold charges, of a source of abnormal air pressure, a conduit for transmitting said pressure to the surface of the glass, and positive automatic means for restoring the air pressure on the surface of the glass to normal when the machine is stopped.

25. In apparatus for separating molten glass into mold charges, the combination with a container for the glass having a submerged outlet, of a reciprocating pump to produce abnormal pressures, means for operating the pump periodically, means for transmitting the abnormal pressures to the glass, and means rendered effective by the reciprocations of the pump for limiting the duration of said abnormal pressures.

26. In apparatus for separating molten glass into mold charges, the combination of a container for the glass having a submerged outlet, of a reciprocating pump comprising a fixed and a movable member, relief means carried by one of said members and arranged to be opened or closed by the relative movement of the said members to limit the duration of abnormal pressure produced by the pump, and means connected to the pump for transmitting said abnormal pressure to the glass to aid in regulating movement of glass through the outlet and in imparting a predetermined artificial shape to the discharged glass suspended below the outlet.

27. In apparatus for separating molten glass into mold charges, the combination of a container for the glass having a submerged outlet, a pump comprising a cylinder and a relatively reciprocable piston for producing periodic pressure variations, relief means adapted to be opened and closed by the motion of the piston to relieve the pressure variations produced thereby, and means connected with the pump for applying the pressure variations to the glass.

28. In apparatus for separating molten glass into mold charges, the combination of a container for the glass having a submerged discharge outlet, a pump connected to apply air pressure to glass in said container, said pump comprising relatively reciprocable cylinder and piston members, and means for changing the length of the stroke of the said pump and for thereby varying its displacement of air to vary the effective action of such air on the glass in said outlet so as to vary the shape of suspended mold charge masses of glass below the outlet.

29. In apparatus for separating molten glass into mold charges, the combination of a container for the glass having a submerged discharge outlet, and a pump connected to apply alternate pressure and vacuum to glass in said container, the said pump comprising a fixed member and a movable member, and being provided with vents, one for relieving pressure and one for relieving vacuum, the said vents being arranged to be opened and closed by relative movement of said pump members.

30. The combination with apparatus for separating molten glass into mold charges, of a container for the glass having a submerged outlet, a pump, means for actuating the pump to apply alternate pressure and vacuum to the glass, and means rendered effective by the operations of the pump for independently adjusting the duration of application of the pressure and vacuum.

31. In glass feeding apparatus, a container for molten glass having a submerged outlet, a pump operable to cause alternating superatmospheric and sub-atmospheric pressures in said pump, means for transmitting said pressures to the glass in the container above the outlet, and adjustable means rendered effective by the pump for regulably controlling the duration of the sub-atmospheric pressure in said operation of the pump.

Signed at Hartford, Conn., this 27th day of July 1920.

KARL E. PEILER.

tion of abnormal pressure produced by the pump, and means connected to the pump for transmitting said abnormal pressure to the glass to aid in regulating movement of glass through the outlet and in imparting a predetermined artificial shape to the discharged glass suspended below the outlet.

27. In apparatus for separating molten glass into mold charges, the combination of a container for the glass having a submerged outlet, a pump comprising a cylinder and a relatively reciprocable piston for producing periodic pressure variations, relief means adapted to be opened and closed by the motion of the piston to relieve the pressure variations produced thereby, and means connected with the pump for applying the pressure variations to the glass.

28. In apparatus for separating molten glass into mold charges, the combination of a container for the glass having a submerged discharge outlet, a pump connected to apply air pressure to glass in said container, said pump comprising relatively reciprocable cylinder and piston members, and means for changing the length of the stroke of the said pump and for thereby varying its displacement of air to vary the effective action of such air on the glass in said outlet so as to vary the shape of suspended mold charge masses of glass below the outlet.

29. In apparatus for separating molten glass into mold charges, the combination of a container for the glass having a submerged discharge outlet, and a pump connected to apply alternate pressure and vacuum to glass in said container, the said pump comprising a fixed member and a movable member, and being provided with vents, one for relieving pressure and one for relieving vacuum, the said vents being arranged to be opened and closed by relative movement of said pump members.

30. The combination with apparatus for separating molten glass into mold charges, of a container for the glass having a submerged outlet, a pump, means for actuating the pump to apply alternate pressure and vacuum to the glass, and means rendered effective by the operations of the pump for independently adjusting the duration of application of the pressure and vacuum.

31. In glass feeding apparatus, a container for molten glass having a submerged outlet, a pump operable to cause alternating superatmospheric and sub-atmospheric pressures in said pump, means for transmitting said pressures to the glass in the container above the outlet, and adjustable means rendered effective by the pump for regulably controlling the duration of the sub-atmospheric pressure in said operation of the pump.

Signed at Hartford, Conn., this 27th day of July 1920.

KARL E. PEILER.

---

CERTIFICATE OF CORRECTION.

Patent No. 1,662,437.  Granted March 13, 1928, to

KARL E. PEILER.

It is hereby certified that error appears in the printed specification of the above numbered patent requiring correction as follows: Page 8, line 60, claim 31, before the word "pump" insert the words "operation of the" and lines 62 and 63 strike out the words "operation of the"; and that the said Letters Patent should be read with these corrections therein that the same may conform to the record of the case in the Patent Office.

Signed and sealed this 3rd day of April, A. D. 1928.

Seal.

M. J. Moore,
Acting Commissioner of Patents.

CERTIFICATE OF CORRECTION.

Patent No. 1,662,437.  Granted March 13, 1928, to

KARL E. PEILER.

It is hereby certified that error appears in the printed specification of the above numbered patent requiring correction as follows: Page 8, line 60, claim 31, before the word "pump" insert the words "operation of the" and lines 62 and 63 strike out the words "operation of the"; and that the said Letters Patent should be read with these corrections therein that the same may conform to the record of the case in the Patent Office.

Signed and sealed this 3rd day of April, A. D. 1928.

Seal.

M. J. Moore,
Acting Commissioner of Patents.